Jan. 13, 1959     K. R. RUNDE     2,868,004
WASHING AND DRYING MACHINES
Filed Oct. 11, 1952     6 Sheets-Sheet 1

INVENTOR
KENNETH R. RUNDE
ATTORNEY

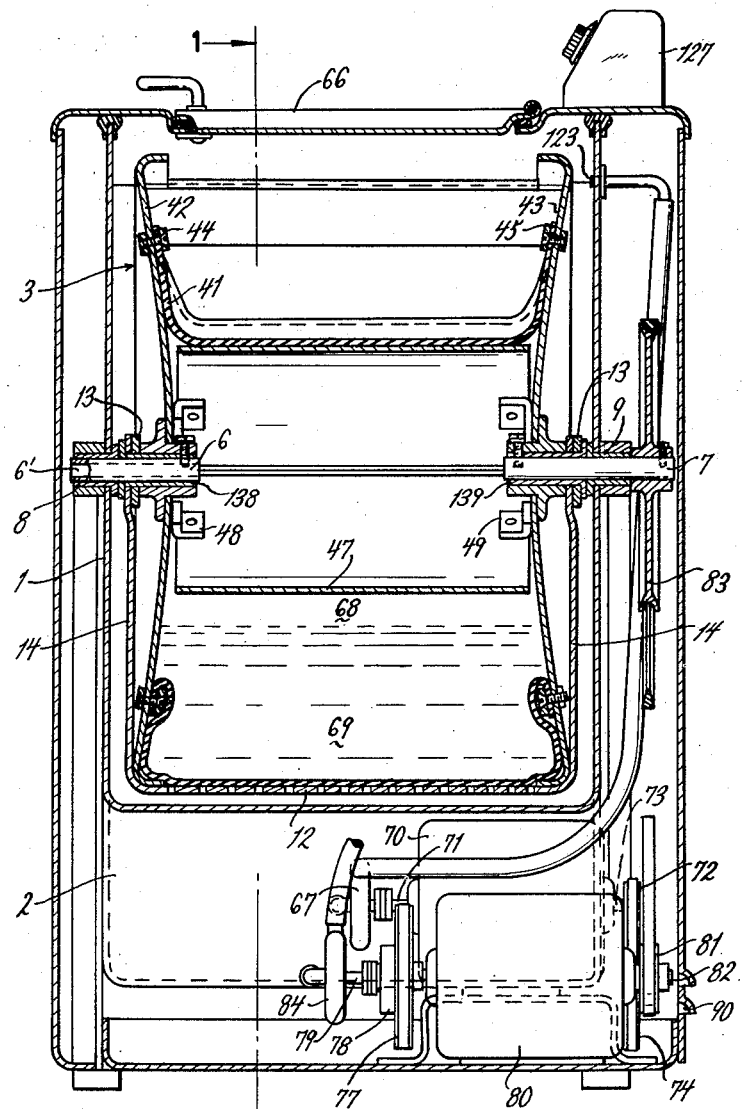
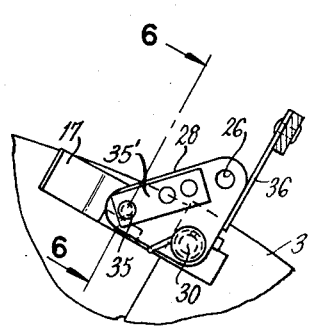
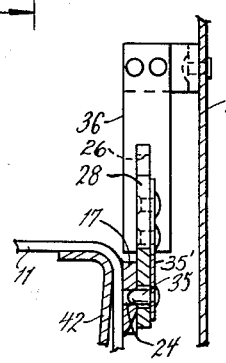
FIG. 4.
FIG. 5.
FIG. 6.
INVENTOR
KENNETH R. RUNDE
BY
ATTORNEY Jan. 13, 1959    K. R. RUNDE    2,868,004
WASHING AND DRYING MACHINES
Filed Oct. 11, 1952    6 Sheets-Sheet 3

INVENTOR.
KENNETH R. RUNDE
BY
ATTORNEY

Jan. 13, 1959 K. R. RUNDE 2,868,004
WASHING AND DRYING MACHINES
Filed Oct. 11, 1952 6 Sheets-Sheet 4
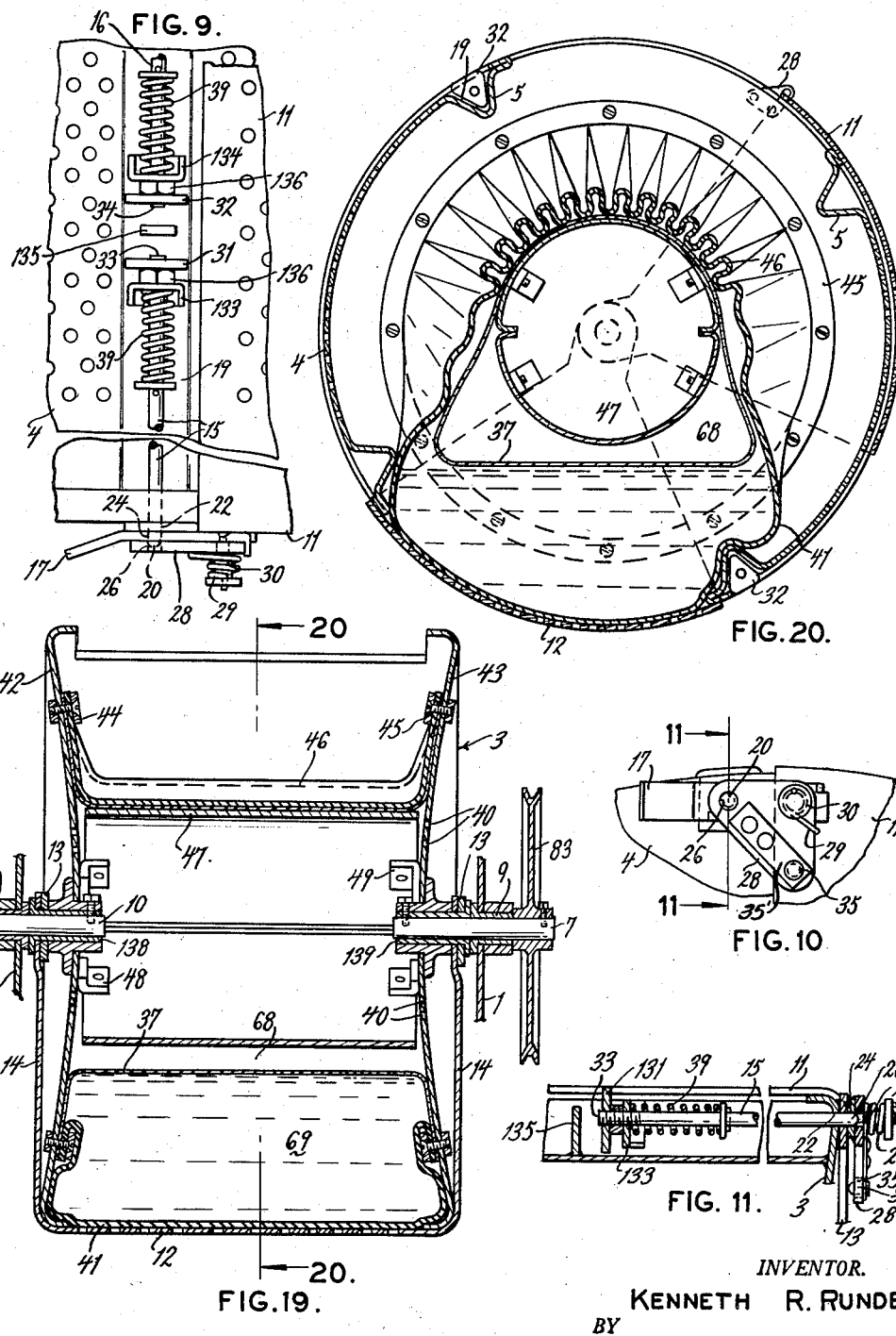
INVENTOR.
KENNETH R. RUNDE
BY
ATTORNEY

INVENTOR.
KENNETH R. RUNDE
ATTORNEY

INVENTOR.
KENNETH R. RUNDE
BY
ATTORNEY

United States Patent Office 2,868,004
Patented Jan. 13, 1959

2,868,004
WASHING AND DRYING MACHINES
Kenneth R. Runde, St. Louis County, Mo.
Application October 11, 1952, Serial No. 314,335
15 Claims. (Cl. 68—12)

The invention here presented broadly is in the field of washing and drying machines; more specifically it presents domestic washing machines for fabrics such as clothes and in detail it is a washing and drying machine which washes and completely dries clothes in the same drum, automatically, using a simple inherent counterbalancing means to eliminate excessive vibration during the high-speed centrifugal extraction cycle.

Thus an object of the invention is to provide a washing and drying machine with a more effective washing action, in which water is introduced into and squeezed from the clothes, entirely above the water level of the reservoir which contains the washing liquid, using considerably less water and detergent than washing machines heretofore known, and to produce a washing machine that does not tangle the clothes. Another object of this invention is to produce a washing and drying machine which will, if desired, completely dry clothes in the same drum in which they are washed, without transferring the clothes from one compartment to another, the whole process being automatically controlled including variable washing and variable drying time. A novel feature is to provide a simple inherent counter-balancing means to compensate for the uneven distribution of clothes during the high-speed centrifugal extraction cycle, thereby eliminating excessive vibration and the need to bolt the machine to a solid base. Another novel feature is to provide a simplified drive system with a simple control system for changing from the slow tumbling speed to the high-speed extraction cycle. The machine of this invention includes drum doors that are provided with a safety means to automatically close the drum doors if they are accidentally left open and the machine started. The design of this machine provides means to dehumidify moist air before it leaves the machine during the drying operation, thus eliminating one of the objectionable features of drying machines, and means serving to trap excess lint and to wash it from the machine automatically are built into the machine of the present invention.

Other objects and details of the invention will be apparent from the following description when read in connection with the accompanying drawings which illustrate several embodiments of the invention and in which Fig. 1 is a vertical sectional view of the machine Fig. 2 is a diagrammatic sectional view on a reduced scale of the drum during the washing cycle.

Fig. 3 is a diagrammatic sectional view on the scale of Fig. 2 of the drum during the extraction cycle.

Fig. 4. is a sectional view taken on line 4—4 of Fig. 1.

Fig. 5 shows spring-operated detent of the machine in open opposition.

Fig. 6. is a fragmentary sectional view taken on line 6—6 of Fig. 5.

Fig. 9 is a view of door latching means of the machine with door in closed position.

Fig. 10 shows the spring-operated detent of the machine shown in Fig. 5 in a closed position.

Fig. 11 is a fragmentary section taken on line 11—11 of Fig. 10.

Fig. 19 shows liquid-retaining member with a complimentary elastic inner member to prevent balancing liquid from escaping by evaporation or splashing out through vent holes.

Fig. 20 is a view taken on line 20—20 of Fig. 19.

Figures 1, 2, 3:
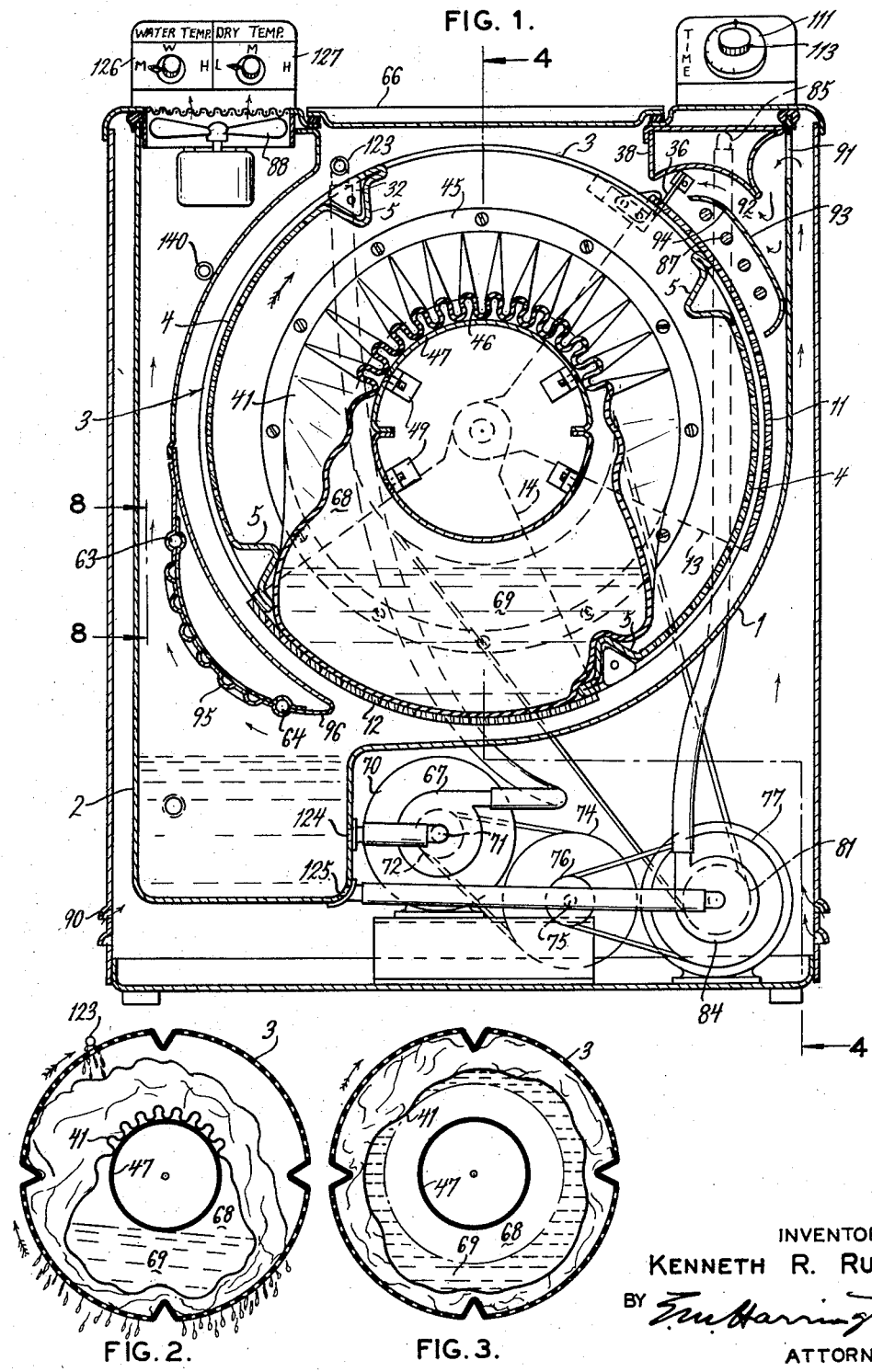
Figure 7:
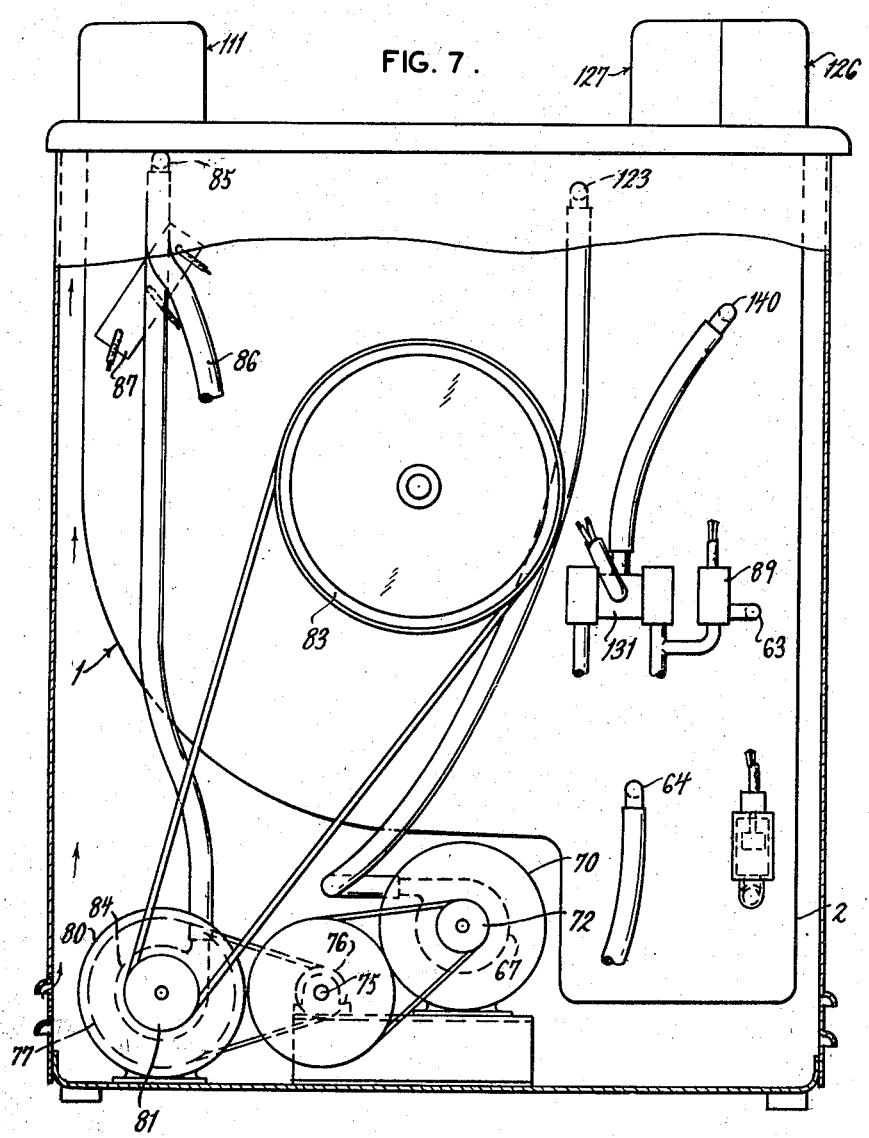
Fig. 7 is a rear view of the machine shown partly in section.
Figure 8:
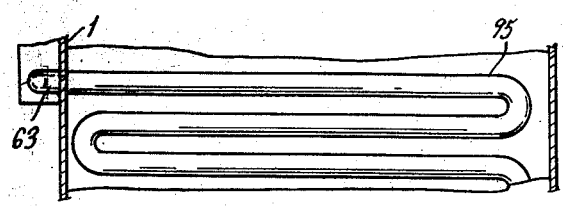
Fig. 8 is a fragmentary sectional view taken on line 8—8 of Fig. 1 showing construction of condenser surface.

The washing and drying machine herein described comprises a tub 1 with a depending reservoir 2 and a generally cylindrical and generally horizontally positioned drum 3 with perforated peripheral walls 4 which are provided with inwardly extended portions that form internal vanes 5. The drum 3 is supported by means of stub shaft 6 on the front side and shaft 7 on the rearward side of the machine. These shafts rotate in a bearing 8 on the front side and bearing 9 on the rearward side of the machine, said bearings being supported by opposed side walls of the tub 1, shaft 6 having a passageway 6' through its center to allow equilization of atmospheric pressure during the various operations. The drum 3 has an arcuately movable door 11 and another arcuately movable door 12, diametrically opposite to each other which are supported by side flanges 13 and 14 respectively, these flanges rotating on shouldered bushings 138 and 139 through which stub shafts 6 and 7 extend (Fig. 4). The outer portions of the doors 11 and 12, which form part of the periphery of the drum, are perforated similar to the balance of the periphery of the drum. The doors may be held in closed position by a single locking rod, or may be held by a pair of locking rods. Door 11 is shown in Fig. 9 held in closed position by a pair of locking rods 15 and 16 that slide in guides 133 and 134 which are welded to trough 19 formed by internal vanes 5. These guides also serve as stops to limit the outward travel of rods 15 and 16. The outer end of locking rod 20 passes through opening 22 in the side wall of drum 3, and also through registering opening 24 in the guide strip 17 which is fastened to flange 13 of door 11, while at the same time passing partly through registering opening 26 in the spring-operated detent 28 that rotates in a restricted path on a small shaft 30 fastened to the outer surface of the door guide strip 17. Flat gripping plates 31 and 32 are attached to the inner ends of 33 and 34 of the locking rods 15 and 16 at a convenient distance apart so that they may be gripped between the thumb and forefinger, against the pressure of the coil springs 39 that normally keep the locking rods 15 and 16 in their outer position.

When gripping plate 31 is moved to center stop 135, which is welded to trough 19, locking rod 15 is withdrawn from opening 26 in the spring actuated detent 28, which now rotates outwardly by pressure of torsion spring 29, and is locked in an open position when the plunger catch 35 reaches a position in register with the opening 24 and under pressure of the flat spring 35' enters opening 24 in door guide strip 17. Locking rod 15 has also been withdrawn from opening 24 in the door guide strip allowing the door to rotate into open position. The door is now free to rotate until the spring operated detent 28 strikes spring stop 36 which is attached to tub wall and located in such a manner that the door will stop just after it has cleared the access opening 38 in the cabinet and upper tub.

When drum 3 is rotated toward the open door 11, either manually or by the normal operation of the machine, detent 28 holds the door from rotating until the door guide strip 17 forces locking rod 15 inwardly and when the rod reaches opening 24 in the guide strip, locking rod 15 now moves outwardly under force of coil spring 39. Simultaneously, rod 15 also pushes plunger catch 35 out of engagement and allows spring stop 36 to return detent 28 to the locked closed position by reason of the fact that locking rod 15 can now move outwardly a little more and partially enter hole 26 in the detent. Inner end of locking rod 15 is threaded and provided with a lock nut 136 to lock rod to gripping plate 31 at the proper outer projection of locking rod 15. Thus if the door is accidently left open, or purposely left open, it will automatically be closed and locked by the rotation of the drum.

A moulded spool-shaped expansible and flexible liquid-retaining member 41 is fastened to the inner walls 42 and 43 of the end members of the drum 3 with clamping rings 44 and 45. Balancing liquid is introduced into this member through aperture 6'. The corrugated center portion 46 is supported internally by cylinder 47 attached with brackets 48 and 49 to the end members of drum 3. The shape of the moulded rubber member is such that when the drum is accelerated to extracting speed, centrifugal force will move the corrugated portions outwardly against the periphery of the drum without appreciable force, due to the fact that the total length of the corrugated section is approximately equal to the inner circumference of the drum, thus requiring only flexing of the member and not the considerable force required to stretch an uncorrugated member. This is important in the early phase of the extraction cycle when it is necessary to permit the balancing liquid to move outwardly without restriction in order to prevent vibration until the drum reaches a high rotational speed sufficient to allow the centrifugal force of the balancing liquid to stretch the member into intimate contact with the clothes being centrifuged.

It is also important for the same reason to allow air to flow freely through aperture 6' in stub shaft 6 to equalize atmospheric pressure when the liquid retaining member moves outwardly under centrifugal force.

Elastic inner member 37 may be used in conjunction with liquid retaining member 41 as shown in Figs. 19 and 20. Air vent may be through a hollow stub shaft as shown in Fig. 4, or through air holes 40 cut through side member of drum as shown in Figs. 19 and 20 when a solid stub shaft 10 is used. Elastic inner member 37 prevents balancing liquid 69 from escaping by either evaporation or splashing.

Figure 22:
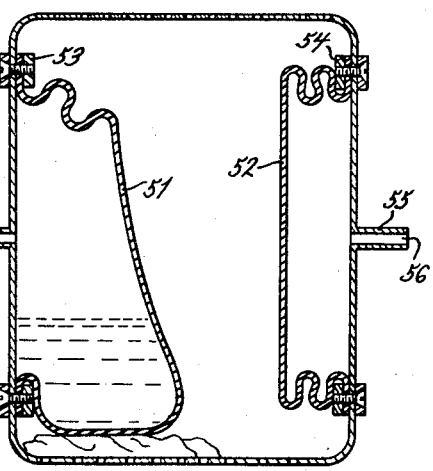
Fig. 22 illustrates still another form of the invention showing two flexible expansible diaphragms as counterbalancing means.

The foregoing is the preferred embodiment of the invention, but similar results are obtained by the use of a pair of circular moulded expansible and flexible liquid retaining diaphragms 51 and 52 (Fig. 22) attached to the inner walls of the end members of the drum near their outer periphery by clamping rings 53 and 54. Equal amounts of liquid are retained behind each diaphragm, and stub shafts 55, which have apertures 56 formed through their centers to allow passage of air to the space behind diaphragms, are parts of the construction.

Figure 21:
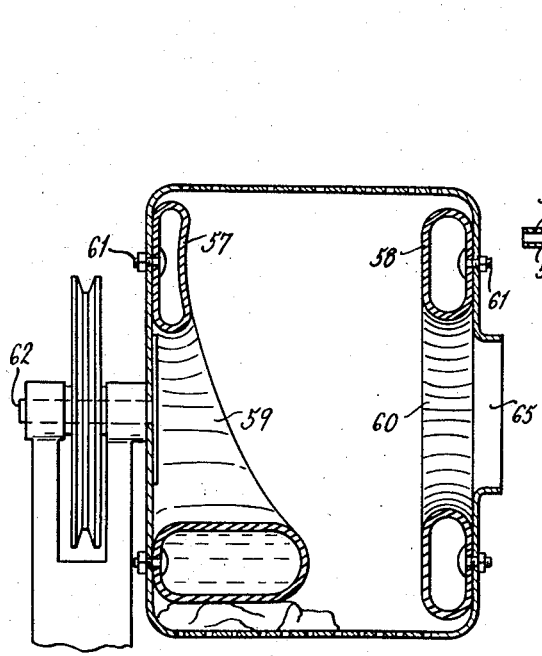
Fig. 21 is a modified form of the invention showing tubular flexible expansible members used as counterbalancing means.

Another embodiment of the same principle is the use of a pair of expansible moulded circular sacks of tubular construction 57 and 58 having their inner diameters 59 and 60 corrugated to allow free expansibility (Fig. 21). Each tube is partially filled with liquid, and the remaining air expelled so that the tube collapses and hangs out of the way at the upper portion of the drum, and the liquid causes the lower portion to spread out and cover the perforated lower portion of the drum. Each tube is fastened to an end member of the drum by a plurality of bolts 61. This construction permits rotating the drum on a single shaft 62 with the access door in the opposite end 65 of the drum, adjacent to the inner diameter of tube 58. No vents are required on the tubes as atmospheric pressure can reach all surfaces at all times.

Figure 15:
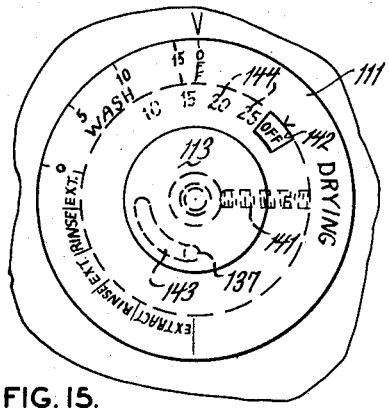
Fig. 15 shows possible settings on timing dial.
Figure 16:
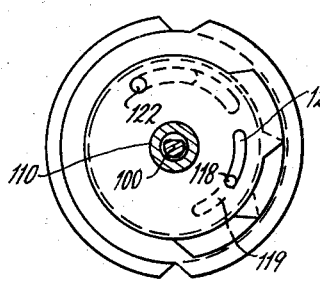
Fig. 16 shows position of adjustable multiple cams in omitting drying cycle.
Figure 17:
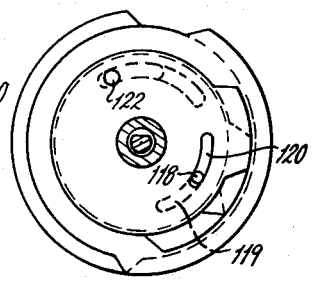
Fig. 17 shows position of adjustable multiple cams for maximum drying cycle.
Figure 18:
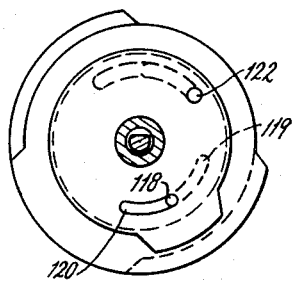
Fig. 18 shows position of adjustable multiple cams for minimum drying cycle.

In the washing operation, the user places detergents in the machine through door 66 in the top of the cabinet. Clothes are then loaded into the machine through either or both drum doors 11 and 12. Door 66 is then closed and locked, and the main timer dial 111 is set for the desired washing cycle, and if drying is desired the central knob 113 is moved from the "off" position shown in Fig. 15 to the desired drying time. As soon as main timer dial is moved from "off" position to the wash sector the machine starts and goes through the timing cycle illustrated in Fig. 12. Water enters the machine through solenoid actuated water valves 131 and thence through hose that is connected to fitting 140. Water drains down partition wall into reservoir 2, and when water reaches proper level the float valve switch opens, and breaks circuit to water valves 131 stopping flow of water. The drum, filled with soiled clothes, which are between the peripheral walls and the liquid retaining member, is rotated at a speed not exceeding $$\sqrt{\frac{2500}{\text{drum radius in feet}}}$$

revolutions per minute and a stream of water is projected out of tube 123 in the side of the tub across the upper periphery of the drum. The water readily goes through the perforations in the drum and drops down on the clothes soaking them in preparation for the squeezing action they receive as they rotate to the bottom (Fig. 2). At the washing speed the liquid retaining member acts as a flexible roller that squeezes the clothes against the perforated outer wall of the drum. The washing and rinsing action thus consists of wetting the clothes and then squeezing the water out each time the drum makes a complete revolution. Instead of dropping to the bottom of the drum after the clothes reach the top of their travel, the clothes drop on the flexible liquid-retaining member which is internally supported by cylinder 47. Since the flexible member is traveling in the same direction as the clothes they are not caused to roll and tangle as is the case when they are allowed to drop to the bottom of a drum, which is traveling in the opposite direction to the direction of travel of the clothes dropping down from the top of the drum. The internal supporting cylinder also prevents the flexible member from sagging down in the middle which in turn causes the clothes to work toward the middle of the drum. When the clothes work to the middle of the drum distribution of the clothes is uneven, and they do not move around freely during the washing and rinsing cycles. This causes uneven washing. The washing action herein described takes place entirely above the normal water level of the reservoir, simulating hand washing wherein the wet clothes are squeezed repeatedly to produce a gentle yet effective washing action. The flexing of the clothes over the internal vanes also is very effective in removing dirt from the clothes.

Some of the advantages of the drum rotating above the normal water level in the tub and reservoir are that only about one-third the water now used by washing machines is required since the clothes are not submerged; only about half as much detergent as now used is necessary to make ample soap or detergent concentration for efficient washing. Another advantage is that washing action can start when the reservoir is only partially filled as the circulating pump 67 is connected near the bottom of the reservoir 2. Several minutes are also saved when the clothes are to be centrifuged, as high speed rotation can start at once since drum is above water level in tub. Thus time is saved not only in the washing cycle, but in each rinse cycle as well. Another advantage is that during the rinse cycle the soap scum loosened from the clothes is washed out and drains to the reservoir where it floats on top of the water, below the level of the drum, and since the circulating water is pumped from near the bottom of the reservoir through passage 124, the scum is thus kept from getting back on the clothes.

Extraction of the water from the clothes after washing and rinsing is accomplished by high-speed rotation of the drum which causes the clothes, the flexible liquid-retaining member 41, and the balancing liquid 69 (the liquid being as near the specific gravity as possible to the material being centrifuged) to be thrown centrifugally against the perforated periphery of the drum. Aperture 6' through stub shaft 6 allows air to flow into the chamber 68 behind the liquid-retaining member and equalize the atmospheric pressure so that the balancing liquid will not be impeded in forcing the flexible liquid-retaining member 41 into intimate contact with the clothes, so that the balancing liquid 69 can perform its function without delay. The rotation of the balancing liquid soon reaches the rotational speed of the drum and fills in any thin spots presented by uneven distribution of the clothes. The inner portion of the spinning liquid assumes a cylindrical shape, (Fig. 3), nearly concentric with the drum shafts. With the balancing liquid of nearly the same specific gravity as the wet clothes, the rotating mass is nearly homogenous and is effectively balanced.

This is vividly demonstrated by soaking a large sheet and arranging it into a big lump that would cause great unbalance. When this wadded sheet is put into the drum of the above described machine and rotated at high speed practically no vibration is encountered, because of the balancing action described above.

During the washing, rinsing, and drying operations, motor 70 is energized. It is a double shaft motor, having the centrifugal circulating pump 67 directly connected to one shaft 71, and a small pulley 72 on the other shaft 73, and belted to a large pulley 74 mounted on countershaft 75. The other end of this countershaft has a small pulley 76 belted to a large pulley 77 with a built-in over-running clutch 78 which is mounted on one shaft 79 of another double-shafted motor 80. When motor 70 is energized, the over-running clutch 78 engages shaft 79 of motor 80 and uses it as a counter-shaft to operate a small pulley 81 which is fastened to shaft 82 on opposite side of motor 80. This pulley 81 in turn is belted to an extra large pulley 83 on the drum stub shaft 7. These three speed reductions are sufficient to operate the drum at the proper low speed.

An extension of the shaft 79 of motor 80 which has over-running pulley 77 mounted on it, is directly connected to the centrifugal drain pump 84, but since motor 80 is acting only as a countershaft and running relatively slow due to two speed reductions from motor 70, it is unable to pump the water high enough to reach the U-shaped return bend 85 in the drain hose 86, and thus cannot empty the tub during the washing and rinsing operations. When the water is to be extracted from the clothes, motor 80 is energized, and since it is directly belted to drum pulley 83 it rotates the drum at high speed, motor 80 running ahead of the over-running pulley 77 and releasing same. Motor 80 also now is turning the centrifugal drain pump 84 at full motor speed and it pumps the waste water out of passageway 125 in the reservoir 2 through pump and out drain hose 86 to the sewer. In practice motor 70 is de-energized as soon as motor 80 is energized.

After the final extraction cycle in which the tub has been pumped out, and the clothes are in a damp dry condition, motor 70 is again energized, but this time no water enters the reservoir, and since nearly all the water has been drained from the circulating pump 67 the clothes cannot now receive any circulating water. At this time the heaters 87 are turned on, as well as exhaust fan 88 and the condensing cooling water valve 89. Air is drawn through louvers 90 near the floor level and picks up heat from the tub walls as it rises to air inlet 91 which leads into tub cavity, located near top of the machine. The passageway 92 to the heaters 87 acts as a baffle to prevent water from leaving the tub during the washing, rinsing, and extracting cycles. Air is heated in going over the back surface 93 of the heat reflector 94, and is directed through the perforated portions of the drum as it revolves, and is pulled through the drum and around the clothes by the exhaust fan 88.

Moisture laden air is dehumidified by passing over the water-cooled condensing surface 95 consisting of two pieces of sheet metal stamped and welded together to form a circuitous path from the top to the bottom of the arcuate division wall 96. At the proper time a solenoid actuated water valve 89 allows cold water to flow into the top of the condenser at 63, through the path between the two pieces of sheet metal, and out at 64 to condense the warm moist air. Reservoir 2 catches the condensate as it drips down. A large percentage of the lint that comes off the clothes as they are dried adheres to these moistened surfaces, and is washed out automatically when entering water runs down the partition walls and over the condenser surface during the next filling operation. Because of the squeezing action of the balancing liquid, air is expelled from the clothes at the lower portion of the drum travel, and when dropped at the top of drum travel, the clothes breathe in the hot air from the heaters, thus aiding the drying process.

Figure 13:
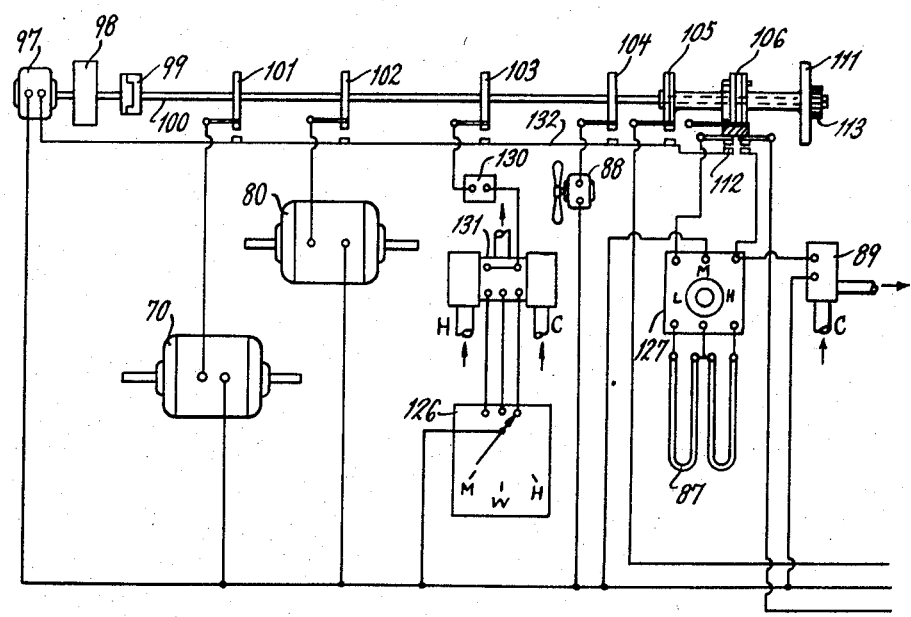
Fig. 13 is a wiring diagram.
Figure 14:
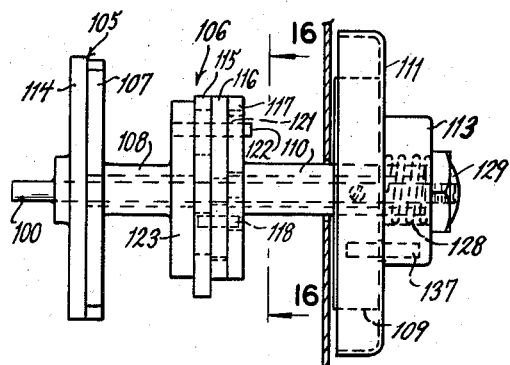
Fig. 14 shows multiple cams in relation to main timing dial and central knob.

Figure 13 is a diagram showing the electrical circuits used with this machine. The small synchronous motor 97 drives speed reducer 98 which in turn operates a small friction clutch 99 which engages main timer shaft 100. Cam 101 controls motor 70; cam 102 controls motor 80; cam 103 energizes circuit to float switch 130 which is closed when tub reservoir is empty and opens when proper water level is reached. The water mixing valves 131 are of the conventional type used on present day wash machines, and are connected in series to float switch 130. Cam 104 controls exhaust fan 88; cam 105 is divided into two parts, part 114 controlling the wash cycle, and part 107 the drying cycle. Cam 106 controls the heaters 87 and cold water valve 89.

The automatic timing mechanism drives the timing cams one revolution in the time consumed in a maximum washing plus a maximum drying cycle. When the main timer dial 111 is turned from the "off" position into wash section the timing motor 97 is energized as well as bus 132 which is connected to all the lower timer contacts on motors 70 and 80, float switch 130, mixing valve 131, fan 88, and one of the twin contacts 112 of the heating circuit. As the timer motor turns the main timer shaft the respective cams make and break the various circuits in accordance with the timing diagram shown in Figure 12.

The operator may set the drying cycle to automatically continue after the washing cycle is completed, or set the controls to stop after the washing, if drying is not desired. The drying control is set by turning central knob 113 in relation to the main timer dial 111. Cam 105 consists of two parts, part 114 the washing cycle part is keyed to main timer shaft 100, while part 107, the drying cycle part is keyed to a tube 108 that fits over main timer shaft 100 and is free to rotate on same. The heater and condenser water cam is made in three pieces that fold together when the drying time is set for minimum, and unfold to the full extent when set for the maximum time. The outer one 115 of these three cams, adjacent to the timer motor cam 105, is keyed to the main timer shaft 100, and the other outer cam 117 is keyed to another section of tubing 110 that rotates around the main timer shaft and is connected at its other end to the central control knob 113 of main timer dial 111. The middle cam 116 of these three cams rotates freely on the main timer shaft and performs the function of a filler between the two outer cams. Its travel is restricted by a pin 118 through same that is fastened to the cam and projects out each side and travels in slot 119 in cam 115, and in slot 120 in cam 117, so that the middle cam 116 cannot leave a gap in the cam surface between any of the three cams. The cam 117 attached to the tubing 110 has an aperture 121 through it that engages a long pin 122 which runs through slots in the other two cams 115 and 116 and is fastened to a disc 123 which is attached to the piece of tubing 108. The heater cycle portion 107 of the timer motor and main bus cam is made so that contact is maintained at all heater settings for approximately five minutes after heaters are off in order to cool the drum and tub so that clothes may be safely removed from machine.

Cam 114 is keyed and brazed to main timer shaft 100 so it cannot move longitudinally. Cam 115 is keyed to shaft 100, but is free to move longitudinally. Tube assemblies 108 and 110, and cam 116 fit loosely over shaft. Outer end of tube 110 is keyed to disc 109 by set screw 141. Main timer dial 111 which fits over disc 109 is keyed to main timer shaft 100, and has a small window 142 cut out of it so that heater markings 144 stamped on disc 109 can be seen. A pin 137 keys disc 109 to central knob 113, and travels through slot 143 cut through main timer dial 111. Compression spring 128 fits in a through hole in central knob 113 and bears against face of main timer dial 111, and against adjusting nut 129 which is fastened to outer end of main timer shaft 100. This presses the flat surfaces of all the adjustable cams together creating sufficient friction to hold the adjusting cams in the position set by operator through the complete cycle of operation.

Figure 12:
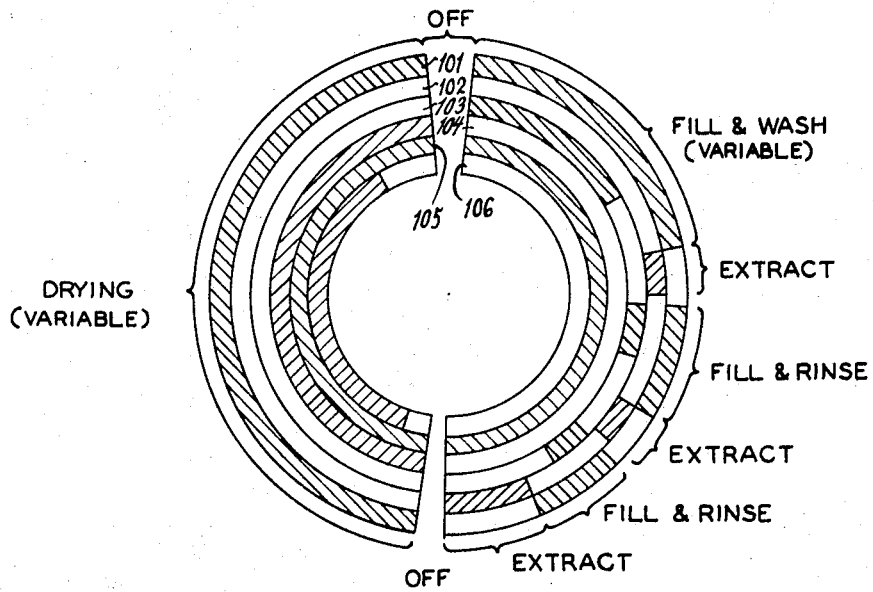
Fig. 12 is a timing diagram.

Figure 12 the timing diagram of the washing and drying cycles illustrates the variability of the washing and drying time.

Water temperature control 126 allows user to set temperture for washing. Drying temperature control 127 allows user to control heat to be used in drying such as low, medium or high, thereby regulating the temperature for rayons, woolens, and cottons.

I claim:

1. A machine for washing fabrics comprising a container, an enclosure supported for rotation within said container on a substantially horizontal axis, said enclosure being provided with a perforated peripheral wall structure, means for delivering fabric washing liquid to said enclosure, and a flexible expansible balancing member, the length of which is approximately equal to the inner circumference of said enclosure and disposed within the latter and partially filled with liquid which is distinct from the liquid delivered into said enclosure and serves as a means for balancing the machine and means for securing the aforementioned length portion of said flexible member to a side wall portion of said enclosure.

2. A machine for washing fabrics comprising a container, an enclosure supported for rotation within said container on a substantially horizontal axis, said enclosure being provided with a perforated peripheral wall structure, means for delivering fabric washing liquid to said enclosure, a flexible generally spool-shaped expansible member, the length of which is approximately equal to the inner circumference of said enclosure and the width of which is approximately the width of said enclosure disposed within said enclosure and partially filled with liquid which is distinct from the liquid delivered into said enclosure and is exclusive of fabrics, said liquid within said flexible sack serving as a means for balancing the machine during operation thereof, and means for securing opposed portions of said sack to opposed wall portions of said enclosure and means to equalize the atmospheric pressure within said flexible member during rotation at high speed.

3. A machine for washing fabrics comprising a container, an enclosure supported for rotation within said container on a substantially horizontal axis said enclosure being provided with a perforated peripheral wall structure, means for delivering liquid into the top of said enclosure, a flexible sack disposed within said enclosure and partially filled with liquid distinct from the liquid delivered into the top of said enclosure, means for securing portions of said sack to opposed wall portions of said enclosure and a cylindrical member extended axially of said enclosure and through said sack.

4. A machine for washing fabrics comprising a container, an enclosure supported for rotation within said container on a substantially horizontal axis, said enclosure being provided with a perforated peripheral wall structure, means for delivering liquid into the top of said enclosure, a flexible sack disposed within said enclosure and partially filled with liquid distinct from the liquid delivered into the top of said enclosure, means for securing portions of said sack to opposed wall portions of said enclosure and a cylindrical member extended axially of said enclosure and through said sack whereby said sack may embrace said cylindrical member on rotation of said enclosure.

5. A machine for washing fabrics comprising a container, an enclosure supported for rotation within said container on a substantially horizontal axis, said enclosure being provided with a perforated peripheral wall structure, means for delivering liquid to said enclosure, means for regulating the liquid level in said container so that said enclosure is maintained in a position out of the liquid in the container, a flexible generally spool-shaped expansible member the length of which is approximately equal to the inner circumference of said enclosure and the width of which is approximately the width of said enclosure disposed within said enclosure and partially filled with liquid which is distinct from the liquid delivered to said enclosure, said liquid within said flexible member serving as a means for balancing the machine to prevent excessive vibration during the latter's operation.

6. A machine for washing fabrics comprising a container, an enclosure supported for rotation within said container on a substantially horizontal axis said enclosure being provided with a perforated peripheral wall structure, means for delivering liquid to said enclosure, means for regulating the liquid level in said container so that said enclosure is maintained in a position out of the liquid in the container, a door which gives access to the interior of said enclosure through a door opening closed by said door and formed through the wall structure of said enclosure, a pair of expansible tubular flexible members, the length of each of which is approximately equal to the inner circumference of said enclosure disposed within said enclosure and partially filled with liquid distinct from the liquid delivered into said enclosure and serving as a means for balancing the machine during operation thereof and is exclusive of fabrics, and means for securing opposed portions of said tubular members to opposed wall portions of said enclosure and positioned so as to allow normal access into said enclosure through said door opening.

7. A machine for washing fabrics comprising a container, an enclosure supported for rotation within said container on a substantially horizontal axis, said enclosure being provided with a perforated peripheral wall structure, means for delivering liquid into the top of said enclosure, means for regulating the liquid level in said container so that said enclosure is maintained in a position out of the liquid in the container, a door which gives access to the interior of said enclosure through a door opening closed by said door and formed through the wall structure of said enclosure, a flexible sack disposed within the said enclosure and partially filled with liquid distinct from the liquid delivered into the top of said enclosure, means for securing portions of said sack to opposed wall portions of said enclosure, and a cylindrical member extended axially of said enclosure and through said sack.

8. A machine for washing fabrics comprising a container, an enclosure supported for rotation within said container on a substantially horizontal axis, said enclosure being provided with a perforated peripheral wall structure, means for delivering liquid into the top of said enclosure, means for regulating the liquid level in said container so that enclosure is maintained in a position out of the liquid in the container, a door which gives access to the interior of said enclosure through a door opening closed by said door and formed through the wall structure of said enclosure, a flexible sack disposed within said enclosure and partially filled with liquid distinct from the liquid delivered into the top of said enclosure, means for securing portions of said sack to opposed wall portions of said enclosure and a cylindrical member extended axially of said enclosure and through said sack whereby said sack may embrace said cylindrical member on rotation of said machine.

9. A machine for washing fabrics comprising a container, an enclosure supported for rotation within said container on a substantially horizontal axis, means including a pair of shaft portions fixedly associated with said enclosure at opposite sides thereof and mounted in bearings fixedly associated with said container for supporting said enclosure for rotation, said enclosure being provided with a perforated peripheral wall structure, means for delivering liquid to said enclosure largely by gravity, means for regulating the liquid level in said container so that said enclosure is maintained in a position substantially out of the liquid in the container and energizing means including a rotative driving shaft for imparting rotary movement to a liquid delivery means and to a driven shaft, which in turn imparts rotary movement to a second driving shaft, said driven shaft drivably connected to said driving shaft and having an over-running clutch mechanism connected thereto, a clutch element fixed on said drive shaft and between said drive and driven shafts and normally maintaining said clutch element declutched, and energizing means for exerting pressure on said first driving shaft to cause rotary movement of the second drive shaft to provide three speed reductions for rotating said enclosure at a tumbling speed sufficient to raise said fabrics substantially to the top of said enclosure.

10. A machine for washing fabrics comprising a container, an enclosure supported for rotation within said container on a substantially horizontal axis, means including a pair of shaft portions fixedly associated with said enclosure and mounted in bearings fixedly associated with said container for supporting said enclosure for rotation, one of said shaft portions being provided with an air passageway which communicates with the interior of said enclosure to equalize atmospheric pressure therein, said enclosure being provided with a perforated peripheral wall structure, means for delivering liquid to said enclosure, and means for regulating the liquid level in said container so that said enclosure is maintained in a position out of the liquid in the container and energizing means including a rotative driving shaft for imparting rotary movement to a driven shaft which in turn imparts rotary movement to a second driving shaft, said driven shaft drivably connected to said driving shaft and having an over-running clutch mechanism connected thereto, an extension of said shaft beyond said clutch mechanism, a drain mechanism connected thereto, a clutch element fixed on said drive shaft and between said drive and driven shafts and normally maintaining said clutch element declutched, energizing means in connection with said second driving shaft for exerting pressure on said clutch element of said driven shaft forcing the same to be clutched and thus into engagement with said second driving shaft to rotate said enclosure at full speed and to simultaneously actuate the drain mechanism to drain liquid from the container.

11. A machine for washing fabrics comprising a container, an enclosure supported for rotation within said container on a substantially horizontal axis, stub shafts for supporting said enclosure, said enclosure being provided with a perforated peripheral wall structure, means for delivering liquid to said enclosure, means for regulating the liquid level in said container so that said enclosure is maintained in a position out of the liquid in the container, a door which gives access to the interior of said enclosure through a door opening closed by said door and formed through the wall structure of said enclosure, said door being supported by a pair of flanges rotatably mounted on said stub shafts, and detent means operably attached to the outer surface of said flange, said detent means rotatable under pressure in a restricted path, and locking means operably attached adjacent to the periphery of the enclosure and disposed parallel to the axis of the latter, said locking means positioned so as to be forced into register with said detent means and operable to automatically close and lock said door on rotation of said enclosure.

12. A machine for washing fabrics comprising a container, an enclosure supported for rotation within said container on a substantially horizontal axis, stub shafts for supporting said enclosure, said enclosure being provided with a perforated peripheral wall structure, means for delivering liquid to said enclosure, means for regulating the liquid level in said container so that said enclosure is maintained in a position out of the liquid in the container, a pair of opposed doors which give access to the interior through door openings closed by said doors and formed through the wall structure of said enclosure said doors being supported by pairs of flanges rotatably mounted on said stub shafts, and having a guide attached to the outer surface of said flange adjacent to the periphery of said enclosure, a detent operably attached to the outer surface of said flange, to normally be in register with said guide, said detent rotatable under pressure in a restricted path, locking means operably attached to the periphery of said enclosure and disposed parallel to the axis of the latter, said locking means positioned so as to be forced into register with said guide and said detent to automatically close and lock said doors on rotation of said enclosure.

13. A machine for washing and drying fabrics comprising, a container, an enclosure rotatable therein and having a perforated wall structure, said container having an upper portion and a lower portion and having an air intake in the lower portion thereof, a heater member having a reflector on the back thereof and positioned in the upper portion of the container and in communication with said enclosure, a fan positioned in the upper portion of said container and opposite from said heater member and in communication with said enclosure, an arcuate condensing surface having a circuitous path to allow moisture laden air to be condensed on said condensing surface and drop into said container.

14. A machine for washing and drying fabrics comprising a container having an upper portion and a lower portion, an enclosure having a perforated wall structure rotatable therein, a heater member having a reflector on the back thereof and positioned in the upper portion of the container and in communication with said enclosure, an arcuate condensing surface having a circuitous path therein positioned adjacent said enclosure and in communication therewith, condensing means to flow through said circuitous path and regulating means including two superimposed movable control knobs having a central control in the top-most position, the latter turning in relation to the former, a main time shaft operably connected to said controls, a sleeve having two sections fitted over said shaft, the former being free to rotate over the latter, a main cam having two portions, a washing portion keyed to the main shaft and a drying portion keyed to a first section of the sleeve, a heater, condenser-water cam including three discs having communicating apertures therethrough and operably fastened to a second section of the rotating sleeve, so constructed as to fold together when a pre-selected drying time is a minimum allotted time and to unfold to the fullest extent when a pre-selected drying time is a maximum of allotted time, comprising a first cam positioned adjacent the washing portion and keyed to the main shaft, a third cam forming an outer boundary, having one end keyed to the second section of the rotating sleeve while its opposite end is connected to the central control knob, a second cam in-between the two aforementioned cams positioned so as to rotate freely on the main time shaft, a fourth cam operably fastened to the first section of the rotating sleeve and positioned adjacent the outer boundary cam, means moving through said communicating apertures to operably link the aforementioned cams with each other and with the drying portion, and the control knobs, to drive the main timing cam one revolution in the time consumed in a maximum washing and drying cycle.

15. A machine for washing fabrics comprising a container, an enclosure supported for rotation within said container on a substantially horizontal axis, said enclosure being provided with a perforated peripheral wall structure, means for delivering liquid to said enclosure, a pair of expansible balancing liquid retaining diaphragms, the length of each of which is approximately equal to the inner circumference of said enclosure and disposed within the latter, means for securing the aforementioned length portion of each respective diaphragm to a respective side portion of said enclosure, and means to equalize the atmospheric pressure within said diaphragm to prevent excessive vibration during rotation at high speed.

References Cited in the file of this patent

UNITED STATES PATENTS

| | | |
|---|---|---|
| 1,195,873 | Thurlow | Aug. 22, 1916 |
| 2,056,833 | Davis | Oct. 6, 1936 |
| 2,133,584 | Spanel | Oct. 18, 1938 |
| 2,165,884 | Chamberlin et al. | July 11, 1939 |
| 2,166,294 | Hetzer | July 18, 1939 |
| 2,291,511 | Traube et al. | July 28, 1942 |
| 2,434,476 | Wales | Jan. 13, 1948 |
| 2,438,597 | Batina | Mar. 30, 1948 |
| 2,475,029 | Kahn | July 5, 1949 |
| 2,539,407 | Dinley | Jan. 30, 1951 |
| 2,607,209 | Constantine | Aug. 19, 1952 |

FOREIGN PATENTS

| | | |
|---|---|---|
| 9,982 | Great Britain | Apr. 23, 1910 |